(12) United States Patent
Kadiri et al.

(10) Patent No.: US 11,032,750 B2
(45) Date of Patent: Jun. 8, 2021

(54) ENHANCED MAKE-BEFORE-BREAK (MBB) HANDOVER FAILURE

(71) Applicant: QUALCOMM Incorporated, San Diego, CA (US)

(72) Inventors: Prasad Reddy Kadiri, San Diego, CA (US); Amer Catovic, Carlsbad, CA (US); Umesh Phuyal, San Diego, CA (US); Karthika Paladugu, San Diego, CA (US); Alberto Rico Alvarino, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 16/506,996

(22) Filed: Jul. 9, 2019

(65) Prior Publication Data

US 2020/0022039 A1 Jan. 16, 2020

Related U.S. Application Data

(60) Provisional application No. 62/696,180, filed on Jul. 10, 2018.

(51) Int. Cl.
*H04W 74/08* (2009.01)
*H04W 36/00* (2009.01)
(Continued)

(52) U.S. Cl.
CPC ......... *H04W 36/0079* (2018.08); *H04L 1/203* (2013.01); *H04W 36/0033* (2013.01);
(Continued)

(58) Field of Classification Search
CPC . H04W 36/0079; H04W 36/08; H04W 76/18; H04W 76/27; H04W 88/023;
(Continued)

(56) References Cited

U.S. PATENT DOCUMENTS

2011/0294508 A1* 12/2011 Min ................. H04W 36/0085
455/436
2013/0176866 A1 7/2013 Yang et al.
(Continued)

FOREIGN PATENT DOCUMENTS

WO 2017138978 A1 8/2017
WO 2019154480 A1 8/2019

OTHER PUBLICATIONS

ZTE Corporation: "RLF analysis on make before break solution", 3GPP Draft; R2-166608, 3GPP TSG RAN WG2 Meeting #95bis Kaohsiung, Oct. 10-14, 2016, 3 Pages (Year: 2016).*
(Continued)

*Primary Examiner* — Lan-Huong Truong
(74) *Attorney, Agent, or Firm* — Harrity & Harrity, LLP

(57) ABSTRACT

Various aspects of the present disclosure generally relate to wireless communication. In some aspects, a user equipment (UE) may detect that a timer has expired prior to completing a handover of the UE from a source base station (BS) to a target BS. In some aspects, the UE may selectively declare, based at least in part on detecting that the timer has expired, a radio link failure. Numerous other aspects are provided.

30 Claims, 8 Drawing Sheets

(51) Int. Cl.
  *H04W 36/08*  (2009.01)
  *H04W 76/18*  (2018.01)
  *H04W 76/27*  (2018.01)
  *H04W 88/02*  (2009.01)
  *H04W 76/30*  (2018.01)
  *H04L 1/20*  (2006.01)

(52) U.S. Cl.
  CPC ....... *H04W 36/08* (2013.01); *H04W 74/0833* (2013.01); *H04W 76/18* (2018.02); *H04W 76/27* (2018.02); *H04W 76/30* (2018.02); *H04W 88/023* (2013.01)

(58) Field of Classification Search
  CPC ............. H04W 76/30; H04W 74/0833; H04W 36/0033; H04W 76/19
  See application file for complete search history.

(56) References Cited

U.S. PATENT DOCUMENTS

| | | | | |
|---|---|---|---|---|
| 2014/0148174 | A1* | 5/2014 | Teyeb | H04W 52/0212 455/441 |
| 2015/0117399 | A1 | 4/2015 | Yang et al. | |
| 2016/0174124 | A1* | 6/2016 | Basu Mallick | H04W 74/006 370/331 |
| 2017/0048898 | A1* | 2/2017 | Jung | H04W 76/10 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)," 3GPP Standard; 3GPP TS 36.331, 3rd Generation Partnership Project (3GPP), Mobile Competence Centre; 650, Route Des Lucioles; F-06921 Sophia-Antipolis Cedex; France, vol. Ran WG2, No. V10.14.0, Sep. 23, 2014 (Sep. 23, 2014), pp. 1-312, XP050925642, [retrieved on Sep. 23, 2014].

International Search Report and Written Opinion—PCT/US2019/041174—ISA/EPO—dated Oct. 7, 2019.

ZTE Corporation: "RLF analysis on make before break solution", 3GPP Draft; R2-166608 RLF Analysis on Make Before Break Solution, 3rd Generation Partnership Project (3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016, Oct. 9, 2016 (Oct. 9, 2016), XP051151105, 3 Pages, Retrieved from the Internet: URL:http://www.3gpp.org/ftp/Meetings_3GPP_SYNC/RAN2/Docs/ [retrieved on Oct. 9, 2016], Sections 1, 2 and 2.2.

* cited by examiner

ENHANCED MAKE-BEFORE-BREAK (MBB) HANDOVER FAILURE

CROSS-REFERENCE TO RELATED APPLICATIONS UNDER 35 U.S.C. § 119

This application claims priority to U.S. Provisional Patent Application No. 62/696,180, filed on Jul. 10, 2018, entitled "TECHNIQUES AND APPARATUSES FOR ENHANCED MAKE-BEFORE-BREAK (MBB) HANDOVER FAILURE," which is hereby expressly incorporated by reference herein.

FIELD OF THE DISCLOSURE

Aspects of the present disclosure generally relate to wireless communication, and more particularly to techniques and apparatuses for enhanced make-before-break (MBB) handover failure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as an eNode B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting that a timer has expired prior to completing a handover of the UE from a source base station (BS) to a target BS. The method may include selectively declaring, based at least in part on detecting that the timer has expired, a radio link failure.

In some aspects, a UE for wireless communication may include memory and one or more processors operatively coupled to the memory. The memory and the one or more processors may be configured to detect that a timer has expired prior to completing a handover of the UE from a source BS to a target BS. The memory and the one or more processors may be configured to selectively declare, based at least in part on detecting that the timer has expired, a radio link failure.

In some aspects, a non-transitory computer-readable medium may store one or more instructions for wireless communication. The one or more instructions, when executed by one or more processors of a UE, may cause the one or more processors to detect that a timer has expired prior to completing a handover of the UE from a source BS to a target BS. The one or more instructions, when executed by the one or more processors of the UE, may cause the one or more processors to selectively declare, based at least in part on detecting that the timer has expired, a radio link failure.

In some aspects, an apparatus for wireless communication may include means for detecting that a timer has expired prior to completing a handover of the apparatus from a source BS to a target BS. The apparatus may include means for selectively declaring, based at least in part on detecting that the timer has expired, a radio link failure.

In some aspects, a method of wireless communication, performed by a target BS, may include determining to release a handover resource associated with a handover of a UE from a source BS to the target BS based at least in part on an indication that the handover has experienced a failure without declaration of a radio link failure. The method may include releasing the handover resource associated with the handover of the UE based at least in part on determining to release the handover resource.

In some aspects, a target BS for wireless communication may include memory and one or more processors operatively coupled to the memory. The memory and the one or more processors may be configured to determine to release a handover resource associated with a handover of a UE from a source BS to the target BS based at least in part on an indication that the handover has experienced a failure without declaration of a radio link failure. The memory and the one or more processors may be configured to release the handover resource associated with the handover of the UE based at least in part on determining to release the handover resource.

In some aspects, a non-transitory computer-readable medium may store one or more instructions for wireless communication. The one or more instructions, when executed by one or more processors of a target BS, may cause the one or more processors to determine to release a handover resource associated with a handover of a UE from a source BS to the target BS based at least in part on an indication that the handover has experienced a failure without declaration of a radio link failure. The one or more instructions, when executed by one or more processors of the target BS, may cause the one or more processors to release the handover resource associated with the handover of the UE based at least in part on determining to release the handover resource.

In some aspects, an apparatus for wireless communication may include means for determining to release a handover resource associated with a handover of a UE from a source BS to the apparatus based at least in part on an indication that the handover has experienced a failure without declaration of a radio link failure. The apparatus may include means for releasing the handover resource associated with the handover of the UE based at least in part on determining to release the handover resource.

In some aspects, a method of wireless communication, performed by a source BS, may include detecting that a connection between a UE and the source BS is associated with a threshold connection condition. The method may include selectively maintaining, during a handover of the UE from the source BS to a target BS, a UE context associated with the UE based at least in part on detecting that the connection between the UE and the source BS is associated with the threshold connection condition.

In some aspects, a source BS for wireless communication may include memory and one or more processors operatively coupled to the memory. The memory and the one or more processors may be configured to detect that a connection between a UE and the source BS is associated with a threshold connection condition. The memory and the one or more processors may be configured to selectively maintain, during a handover of the UE from the source BS to a target BS, a UE context associated with the UE based at least in part on detecting that the connection between the UE and the source BS is associated with the threshold connection condition.

In some aspects, a non-transitory computer-readable medium may store one or more instructions for wireless communication. The one or more instructions, when executed by one or more processors of a source B S, may cause the one or more processors to detect that a connection between a UE and the source BS is associated with a threshold connection condition. The one or more instructions, when executed by one or more processors of the source BS, may cause the one or more processors to selectively maintain, during a handover of the UE from the source BS to a target BS, a UE context associated with the UE based at least in part on detecting that the connection between the UE and the source BS is associated with the threshold connection condition.

In some aspects, an apparatus for wireless communication may include means for detecting that a connection between a UE and the apparatus is associated with a threshold connection condition. The apparatus may include means for selectively maintaining, during a handover of the UE from the source BS to a target BS, a UE context associated with the UE based at least in part on detecting that the connection between the UE and the source BS is associated with the threshold connection condition.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
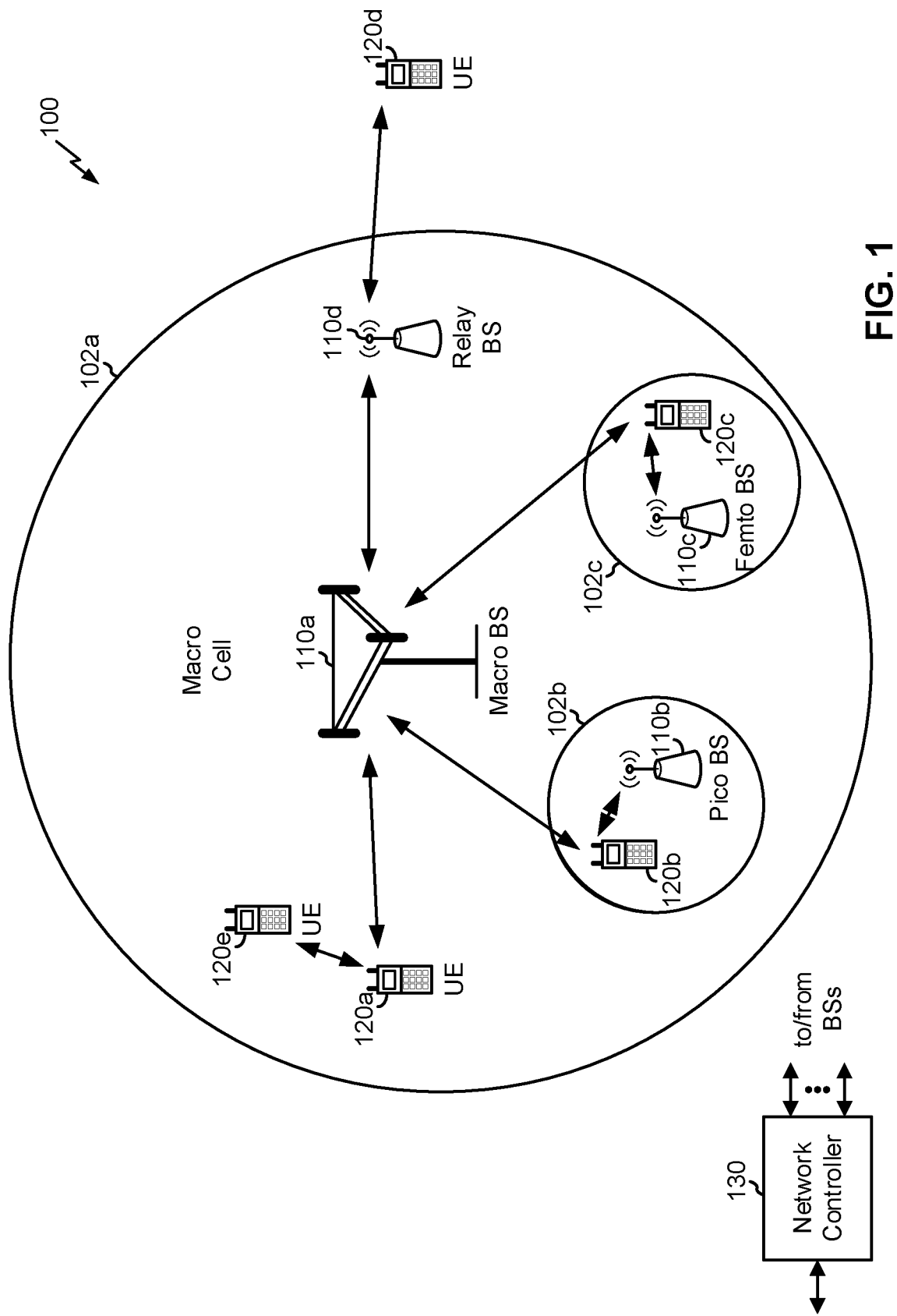
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
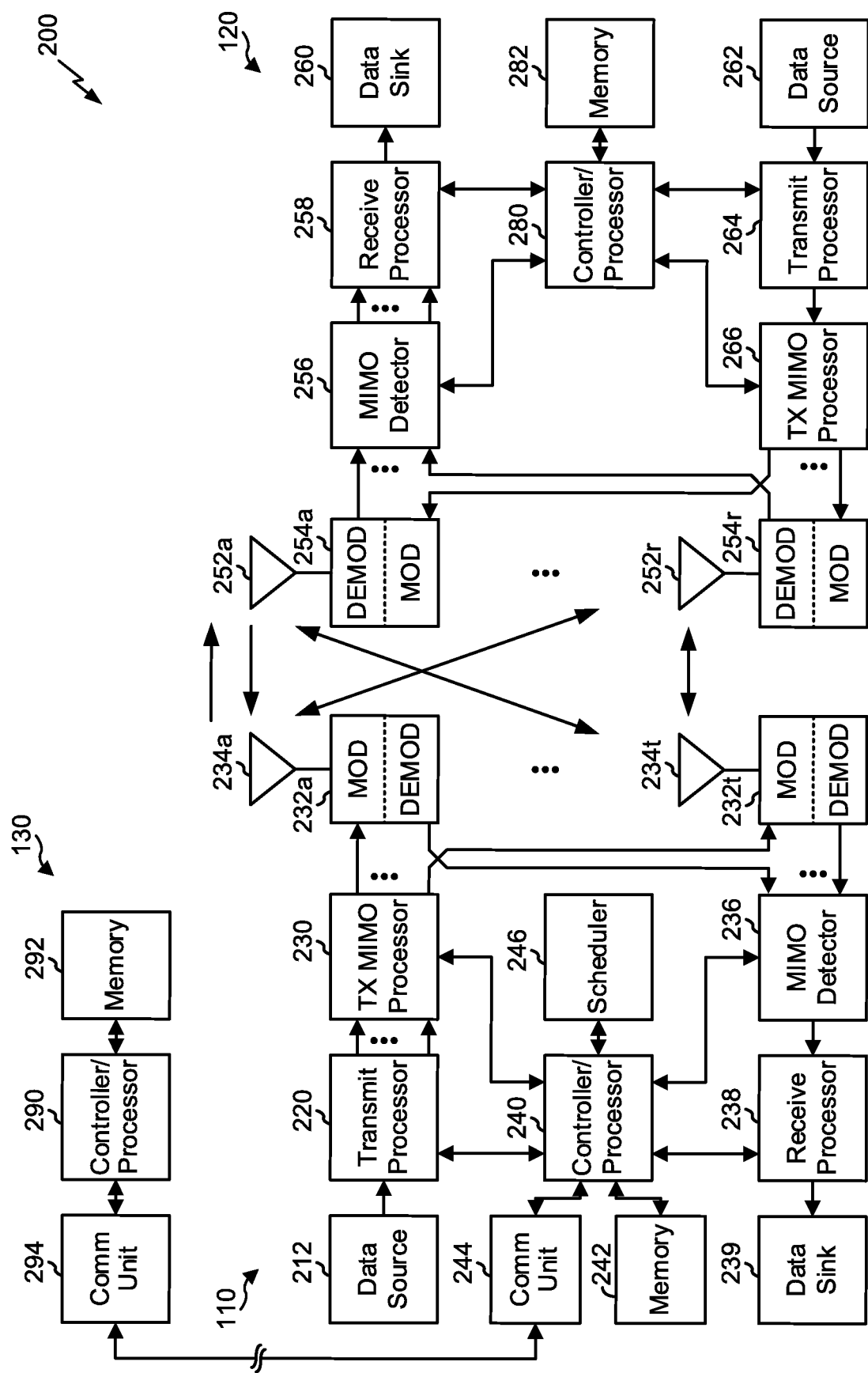
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with enhanced make-before-break (MBB) handover failure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for detecting that a timer has expired prior to completing a handover of the UE 120 from a source BS to a target BS, means for selectively declaring, based at least in part on detecting that the timer has expired, a radio link failure, and/or the like. In some aspects, such means may include one or more components of UE 120 described in connection with FIG. 2.

In some aspects, base station 110 may include means for determining to release a handover resource associated with a handover of a UE from a source BS 110 to a target BS 110 based at least in part on an indication that the handover has experienced a failure without declaration of a radio link failure, means for releasing the handover resource associated with the handover of the UE based at least in part on determining to release the handover resource, and/or the like. In some aspects, such means may include one or more components of base station 110 described in connection with FIG. 2.

In some aspects, base station 110 may include means for detecting that a connection between a UE and a source BS 110 is associated with a threshold connection condition, means for selectively maintaining, during a handover of the UE from the source BS 110 to a target BS 110, a UE context associated with the UE based at least in part on detecting that the connection between the UE and the source BS 110 is associated with the threshold connection condition, and/or the like. In some aspects, such means may include one or more components of base station 110 described in connection with FIG. 2.

As indicated above, FIG. 2 is provided merely as an example. Other examples may differ from what is described with regard to FIG. 2.

A source BS (e.g., a serving BS, etc.) may perform a handover of a UE to a target BS. For example, a UE in motion may be handed over from one BS to another BS as the UE moves through cells provided by different BSs.

Mobility enhancements for UE handover may have certain design targets, such as approximately zero millisecond handover interruption latency (e.g., for real-time gaming applications and other ultra-reliable low latency communications (URLLC) applications), a threshold handover reliability, and/or the like. To satisfy these design targets, an enhanced make-before-break (MBB) handover technique may be used to hand over a UE from a source BS to a target BS. For example, an enhanced MBB handover may include a two protocol stack handover, a low latency or zero latency handover, and/or the like.

Continuing with the previous example, this technique may include dual Rx/dual Tx, dual Rx/single Tx, single Rx/single Tx, dual PHY, dual L2 stack (e.g., medium access control (MAC), radio link control (RLC), packet data convergence protocol (PDCP), and/or the like) during handover, security key switch during handover, PDCP sequence number continuity after handover, support for both intra-frequency and inter-frequency BS handover, support for synchronous and asynchronous BS handover, random access channel (RACH)-based handover, and/or the like. Continuing still with the previous example, a handover according to this technique may include a multi-phase handover where two protocol stacks are used to hand over the UE from a source BS to a target BS (e.g., a first protocol stack is used for continued communications with the source BS while the second protocol stack is used for handover of the UE from the source BS to the target BS). While this technique may facilitate satisfaction of design targets related to reliability and/or latency, this technique may experience a threshold handover failure rate, a threshold amount of ping-pong handover signaling, and/or the like.

Some techniques and apparatuses described herein provide for handover failure during an enhanced MBB handover (e.g., a two protocol stack handover, a low latency or zero latency handover, and/or the like). For example, some techniques and apparatuses described herein provide for dynamically controlling when a UE declares a radio link failure (RLF) and provide for other signaling that the UE can use to notify a source BS that the UE has experienced a handover failure. This facilitates performance of actions by the UE, the source BS, and/or a target BS to rectify the handover failure without a loss of a source connection between the UE and the source BS. This reduces or eliminates a loss of communications for the UE during a handover failure, thereby improving communications of the UE. In addition, this reduces or eliminates ping-pong signaling that would otherwise occur as a result of a handover failure, thereby conserving processing resources of devices that send and/or receive the ping-pong signaling, thereby conserving network resources (e.g., bandwidth) that would otherwise be consumed communicating the ping-pong signaling, and/or the like. Further, this improves a reliability of a handover when a handover failure occurs, such as by reducing or eliminating loss of communications for the UE as a result of the handover failure.

Figure 3:
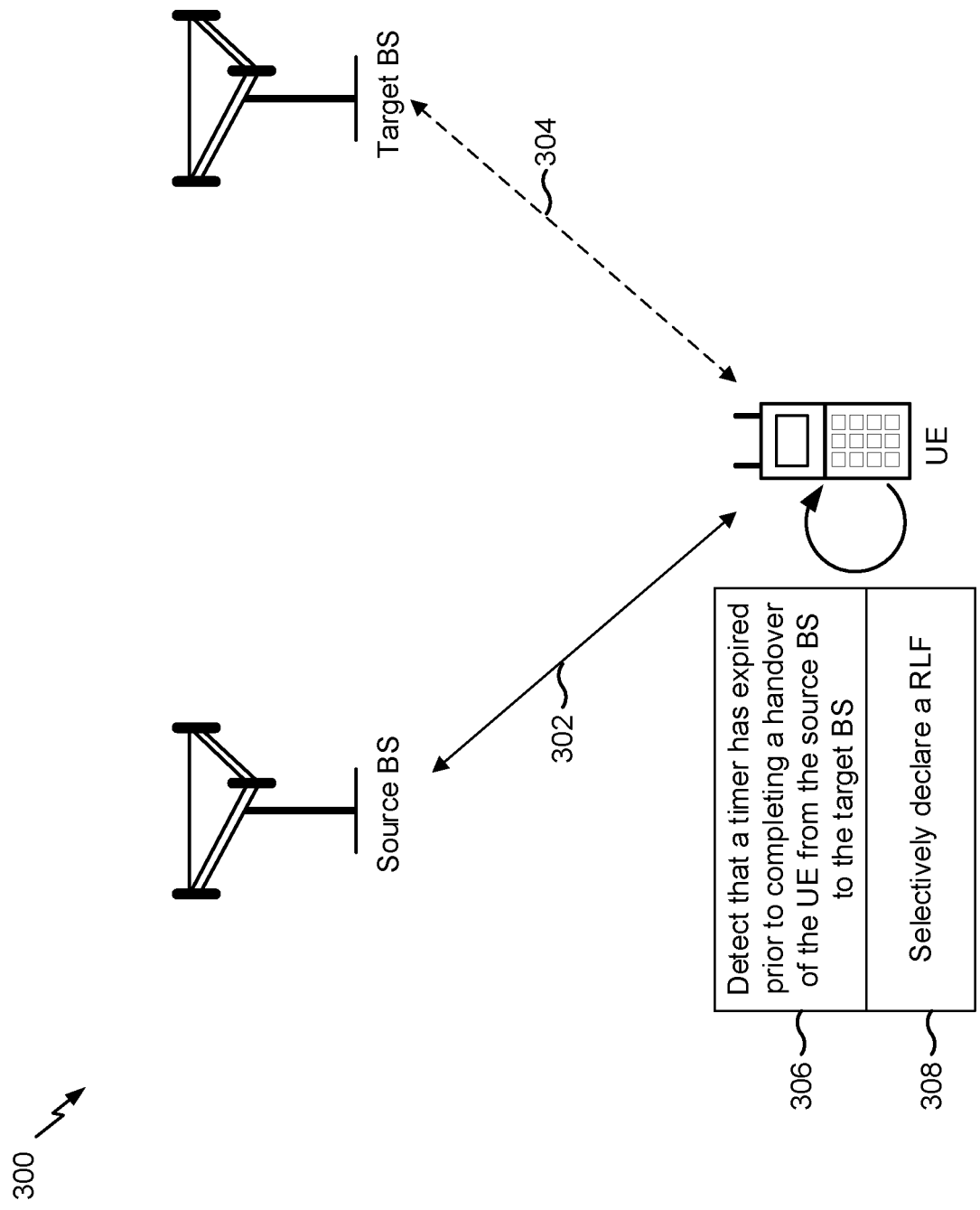
FIG. 3 is a diagram illustrating an example of enhanced make-before-break (MBB) handover failure, in accordance with various aspects of the present disclosure.

FIG. 3 is a diagram illustrating an example 300 of enhanced make-before-break (MBB) handover failure, in accordance with various aspects of the present disclosure. As shown in FIG. 3, example 300 includes a UE (e.g., UE 120), a source BS (e.g., BS 110) (e.g., a BS to which the UE is connected via a source connection), and a target BS (e.g., BS 110) (e.g., a BS to which the UE is being handed over and is to be connected via a target connection).

As shown in FIG. 3, and by reference number 302, the UE and the source BS may be connected via the source connection. In the example shown in FIG. 3, the UE is being handed over from the source BS to the target BS. As shown by reference number 304, the UE may be attempting to establish the target connection with the target BS. For example, the UE, the source BS, and the target BS may be performing an enhanced MBB handover to hand over the UE from the source BS to the target BS (e.g., where two protocol stacks are used to maintain the source connection with the source BS and to establish the target connection with the target BS).

As shown by reference number 306, the UE may detect that a timer has expired prior to completing a handover of the UE from the source BS to the target BS. For example, the timer may include a T304 timer that the UE initiates based at least in part on receiving a radio resource control (RRC) connection reconfiguration message (e.g., that includes mobility control information) from the source BS. In some aspects, the UE may use the timer to detect a handover failure (e.g., expiration of the timer may indicate a handover failure with regard to a handover of the UE from the source BS to the target BS). For example, the UE may detect a timeout a handover of the UE if the handover is not completed by expiration of the timer.

As shown by reference number 308, the UE may selectively declare a radio link failure (RLF). For example, the UE may declare the RLF, or may not declare the RLF, based at least in part on detecting that the timer has expired.

In some aspects, the UE may determine whether the source connection between the UE and the source BS is associated with a threshold connection condition. For example, a threshold connection condition may be based at least in part on a threshold reference signal received power (RSRP) associated with the source connection, a threshold reference signal received quality (RSRQ) associated with the source connection, a threshold block error rate (BLER) associated with the source connection, and/or the like.

In some aspects, if the UE determines that the source connection is associated with a threshold connection condition, then the UE may not declare the RLF. In this way, the UE can maintain communications with the source BS while attempting to establish the target connection with the target BS. This provides a way for the UE to handle a handover failure while reducing or eliminating ping-pong handover signaling as a result of the handover failure, to improve reliability of the handover during a handover failure, and/or the like.

In some aspects, if the UE determines not to declare the RLF (e.g., when the source connection is associated with a threshold connection condition), then the UE may transmit, to the source BS, an RRC message. For example, the RRC message may be associated with indicating to the source BS, or may indicate to the source BS, that a handover failure has occurred with respect to the handover of the UE from the source BS to the target BS. In some aspects, the RRC message may be associated with causing the source BS to notify the target BS of the handover failure (e.g., the source BS may notify the target BS of the handover failure based at least in part on receiving the RRC message from the UE).

In some aspects, the RRC message may cause the source BS to continue with data scheduling, data transfer, and/or the like for the UE during the handover failure. This reduces or eliminates interruptions to communications of the UE despite occurrence of a handover failure. In some aspects, when the UE does not declare the RLF during a handover failure, the UE may continue to use a signaling radio bearer (SRB) associated with the source BS or a data radio bearer (DRB) associated with the source BS during the handover failure. This facilitates continued communications between the UE and the source BS during a handover failure.

In some aspects, if the UE detects that the source connection between the UE and the source BS is not associated with a threshold connection condition, then the UE may declare the RLF. For example, the UE may declare the RLF based at least in part on detecting that the source connection is not associated with the threshold connection condition. For example, the UE may need a threshold connection condition to maintain communications between the UE and the source BS, and may declare the RLF based at least in part on being incapable of maintaining communications with the source BS. In some aspects, and based at least in part on declaring the RLF, the UE may use an RLF recovery mechanism, such as to recover the source connection. For example, the UE may return to using a configuration associated with a source cell associated with the source BS. This facilitates recovery of a source connection when the source connection is not associated with a threshold connection condition and when the UE experiences a handover failure during a handover of the UE from the source UE to the target UE.

In some aspects, when the UE detects the RLF (e.g., on the source BS while performing a random access channel procedure on the target BS, or after successfully connecting to the target BS), the UE may continue the random access channel procedure on the target BS without triggering a radio resource control connection reestablishment. In some aspects, the UE may release a source stack and a source connection, and may forgo releasing a source connection that does not exist in connection with receiving a radio resource control connection reconfiguration message. In some aspects, the UE may transmit a radio link failure information message (e.g., identifying the RLF on the source BS and identifying a source cell identifier for the source BS) to the target BS. In this case, the target BS may cause a release of UE resources and/or a UE context at the source BS. In some aspects, if a target BS setup procedure fails (e.g., based at least in part on a T304 timer) after the source BS is released, the UE may trigger a radio resource control connection reestablishment (e.g., based at least in part on the source BS connection being released).

As indicated above, FIG. 3 is provided as an example. Other examples may differ from what is described with respect to FIG. 3.

Figure 4:
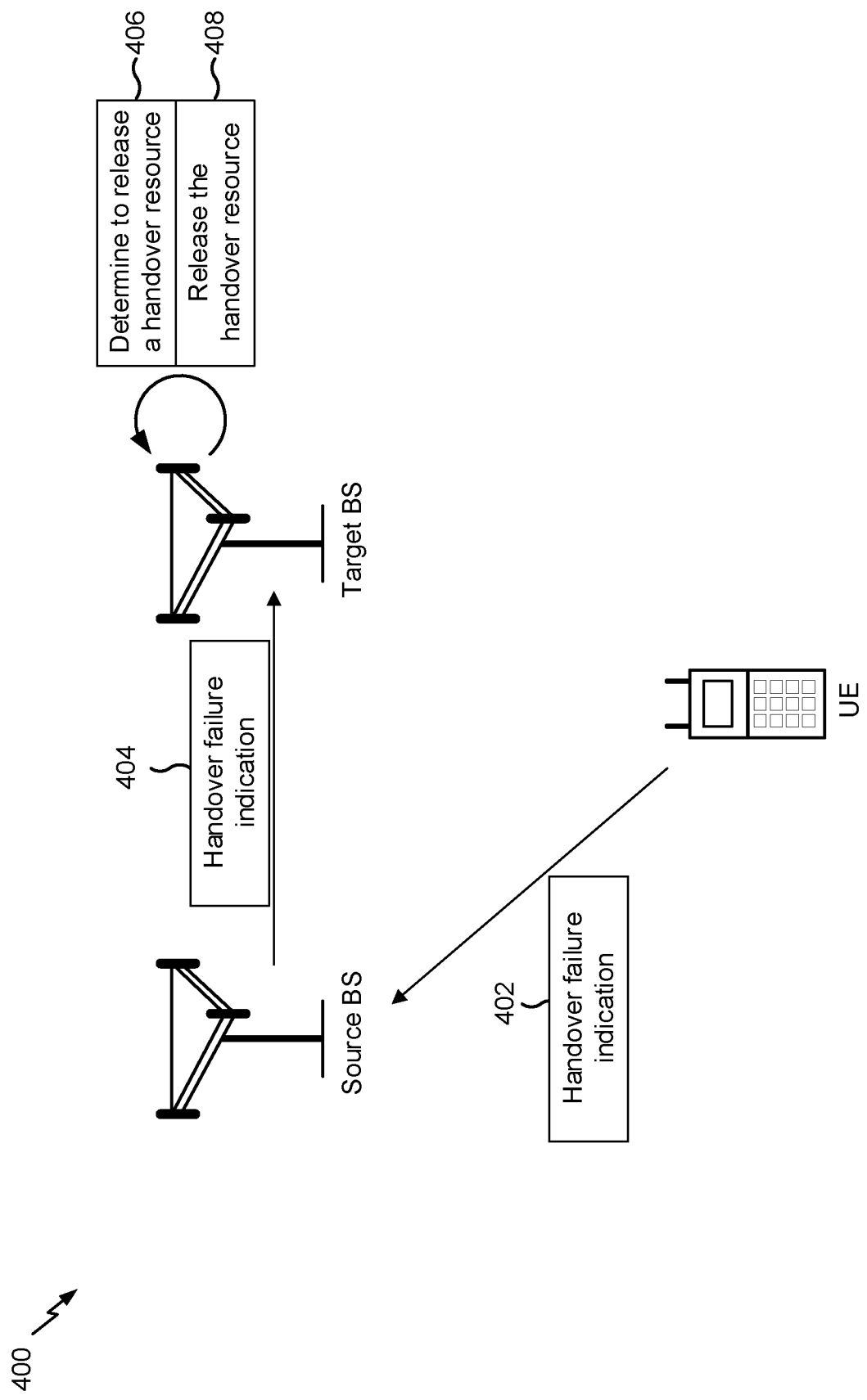
FIG. 4 is a diagram illustrating an example of release of a handover resource by a target BS, in accordance with various aspects of the present disclosure.

FIG. 4 is a diagram illustrating an example 400 of release of a handover resource by a target BS, in accordance with various aspects of the present disclosure. As shown in FIG. 4, example 400 includes a UE (e.g., UE 120), a source BS (e.g., BS 110) (e.g., a BS to which the UE is connected via a source connection), and a target BS (e.g., BS 110) (e.g., a BS to which the UE is being handed over and to which the UE is to be connected via a target connection).

In example 400, the UE has experienced a handover failure during a handover of the UE from the source BS to the target BS, as described in more detail above in connection with FIG. 3. For example, a timer (e.g., a T304 timer) initiated by the UE may have expired without the UE being successfully handed over to the target BS.

As shown by reference number 402, the UE may transmit, and the source BS may receive, a handover failure indication. For example, the UE may transmit the handover failure indication based at least in part on determining that the timer has expired and/or determining that a source connection between the UE and the source BS is associated with a threshold connection condition, in a manner similar to that described elsewhere herein. In some aspects, the UE may transmit the handover failure indication based at least in part on not declaring an RLF, in a manner similar to that described elsewhere herein with respect to reference number 308 (e.g., the handover failure indication may be included in the RRC message that the UE transmits).

As shown by reference number 404, the source BS may transmit, and the target BS may receive, the handover failure indication. For example, the source BS may transmit the handover failure indication based at least in part on receiving the handover failure indication from the UE. In some aspects, the source BS may transmit the handover failure indication to the target BS based at least in part on the UE having experienced the handover failure. In this way, the target B S may be notified of the handover failure despite the target BS lacking the target connection between the UE and the target BS as a result of the handover of the UE experiencing a failure.

As shown by reference number 406, the target B S may determine to release a handover resource. For example, the target BS may determine to release the handover resource based at least in part on receiving the handover failure indication from the source BS (e.g., that indicates that the handover has experienced a failure) without the UE declaring an RLF. In some aspects, the handover resource may be associated with a handover of the UE from the source BS to the target BS. In some aspects, a handover resource may include a time frequency resource allocated for the handover of the UE from the source BS to the target BS.

In some aspects, the target B S may initiate a timer related to releasing the handover resource. For example, the target BS may initiate a timer related to releasing the handover resource based at least in part on receiving the handover failure indication from the source B S. Additionally, or alternatively, and as another example, the target BS may initiate a timer related to releasing the handover resource based at least in part on transmitting, to the source B S, a handover request acknowledgement (ACK). In some aspects, the target B S may determine to release the handover resource based at least in part on expiration of the timer relating to releasing the handover resource.

As shown by reference number 408, the target B S may release the handover resource. For example, the target BS may release the handover resource based at least in part on determining to release the handover resource (e.g., based at least in part on receiving the handover failure indication, expiration of the timer after initiating the timer, and/or the like). Thus, time resources of the target B S and the UE are conserved and can be used for other purposes.

As indicated above, FIG. 4 is provided as an example. Other examples may differ from what is described with respect to FIG. 4.

Figure 5:
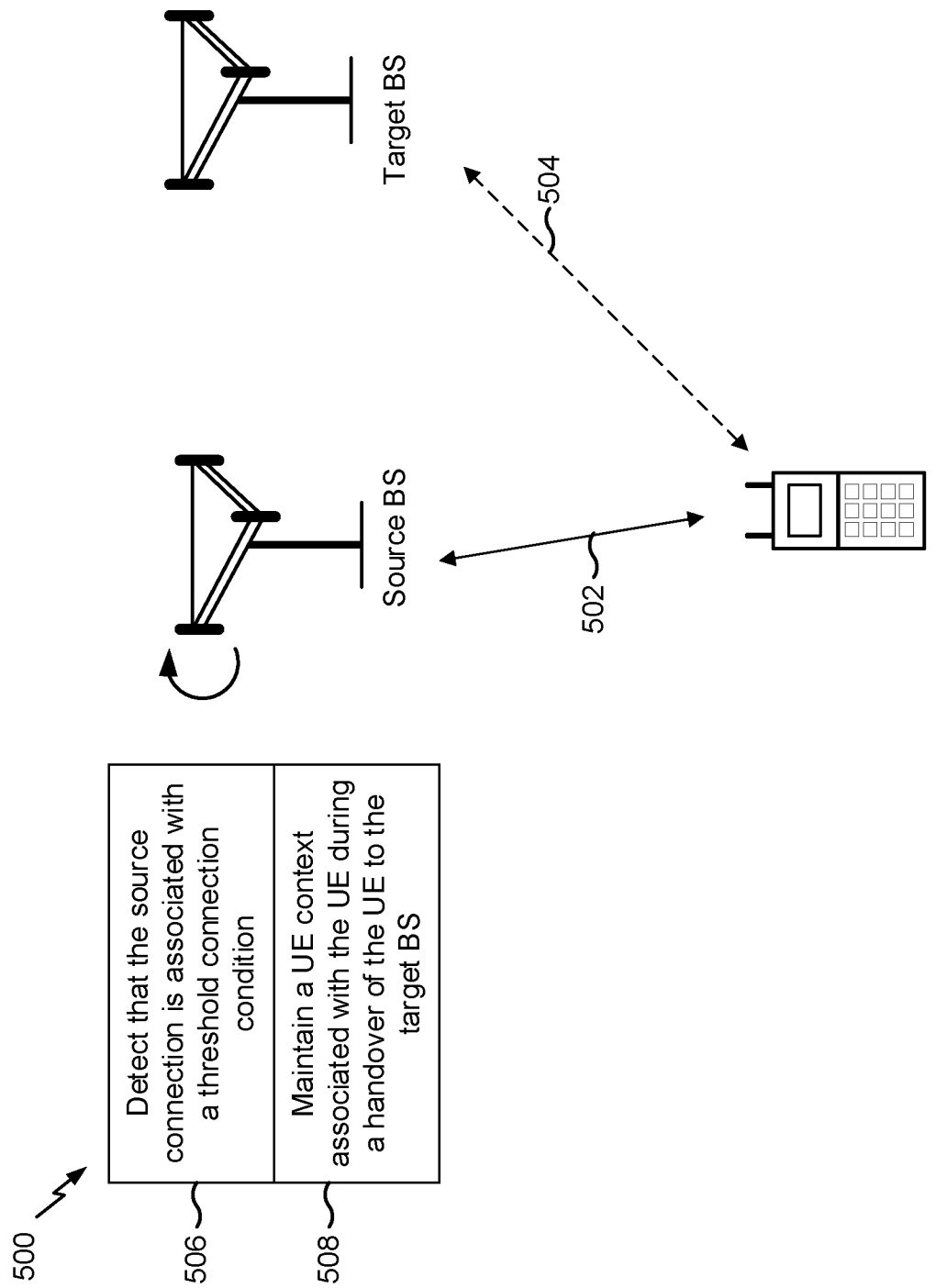
FIG. 5 is a diagram illustrating an example of release of a UE context by a source BS, in accordance with various aspects of the present disclosure.

FIG. 5 is a diagram illustrating an example 500 of release of a UE context by a source BS, in accordance with various aspects of the present disclosure. As shown in FIG. 5, example 500 includes a UE (e.g., UE 120), a source BS (e.g., BS 110) (e.g., a BS to which the UE is connected via a source connection), and a target BS (e.g., BS 110) (e.g., a BS to which the UE is to be handed over and to which the UE is to be connected via a target connection).

As shown in FIG. 5, and by reference number 502, the UE and the source BS may be connected via the source connection. In the example shown in FIG. 5, the UE is being handed over from the source BS to the target BS. As shown by reference number 504, the UE may be attempting to establish the target connection with the target BS. For example, the UE, the source BS, and the target BS may be performing an enhanced MBB handover of the UE from the source BS to the target BS (e.g., where two protocol stacks are used to maintain the source connection with the source BS, and to establish the target connection with the target BS, respectively).

As shown by reference number 506, the source BS may detect that the source connection is associated with a threshold connection condition (e.g., a threshold connection condition may facilitate a data transfer between the UE and the source BS). For example, the source BS may detect that the source connection is associated with a threshold connection condition in a manner that is similar to that described elsewhere herein. In some aspects, the source BS may detect that the source connection is associated with the threshold connection condition based at least in part on receiving a handover failure indication, similar to that described elsewhere herein, from the UE.

As shown by reference number 508, the source BS may maintain a UE context associated with the UE during a handover of the UE to the target BS. For example, the source BS may maintain the UE context based at least in part on detecting that the source connection between the UE and the source BS is associated with the threshold connection condition. The UE context may identify information associated with handing over the UE from the source BS to the target BS, such as security information, a UE identifier, and/or other information used to perform handover of the UE.

In some aspects, the source BS may maintain the UE context based at least in part on failing to receive, from the target BS, an indication to transmit an X2 data forward indication to the UE. For example, as a result of the handover experiencing a handover failure, the target BS may fail to transmit, to the source BS, the indication to transmit the X2 data forward indication to the UE, and the source BS may maintain the UE context based at least in part on failing to receive the indication.

Additionally, or alternatively, the source BS may maintain the UE context based at least in part on failing to receive a UE context release indication from the target BS. For example, as a result of the handover experiencing the handover failure, the target BS may fail to transmit a UE context release indication to the source BS, and the source BS may maintain the UE context based at least in part on this.

Additionally, or alternatively, the source BS may maintain the UE context based at least in part on detecting expiration of a timer associated with the handover of the UE from the source BS to the target BS. For example, the source BS may initiate a timer based at least in part on initiation of the handover of the UE from the source BS to the target BS, and may maintain the UE context based at least in part on detecting expiration of the timer without receiving an indication that the UE has been successfully handed over from the source BS to the target BS.

As indicated above, FIG. 5 is provided as an example. Other examples may differ from what is described with respect to FIG. 5.

Figure 6:
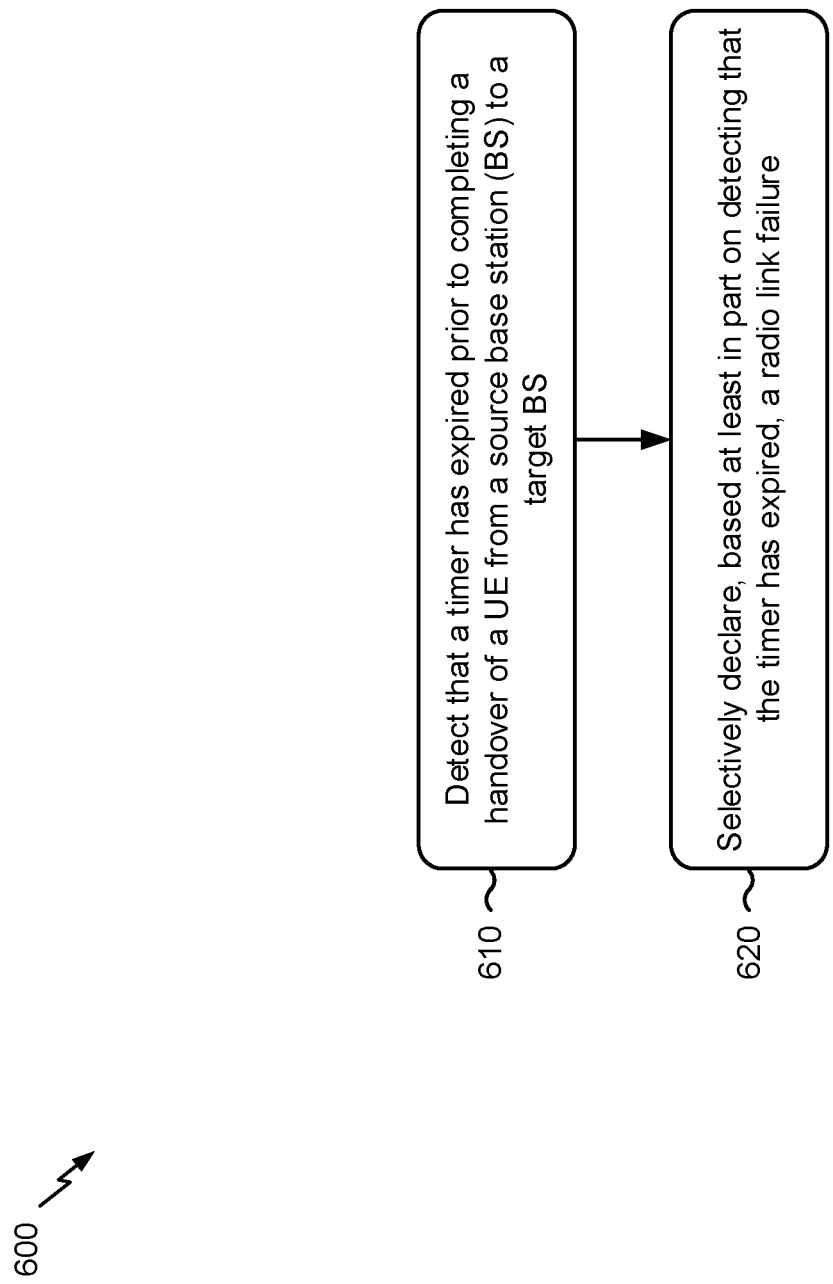
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with enhanced make-before-break (MBB) handover failure.

As shown in FIG. 6, in some aspects, process 600 may include detecting that a timer has expired prior to completing a handover of the UE from a source BS to a target BS (block 610). For example, the UE (e.g., using receive processor 258, transmit processor 264, controller/processor 280, memory 282, and/or the like) may detect that a timer has expired prior to completing a handover of the UE from a source BS to a target BS, as described above.

As further shown in FIG. 6, in some aspects, process 600 may include selectively declaring, based at least in part on detecting that the timer has expired, a radio link failure (block 620). For example, the UE (e.g., using receive processor 258, transmit processor 264, controller/processor 280, memory 282, and/or the like) may selectively declare, based at least in part on detecting that the timer has expired, a radio link failure, as described above.

Process 600 may include additional aspects, such as any single aspect or any combination of aspects described below and/or in connection with one or more other processes described elsewhere herein.

In a first aspect, the timer is a T304 timer.

In a second aspect, alone or in combination with the first aspect, the UE does not declare the radio link failure, based at least in part on detecting that a connection between the UE and the source BS is associated with a threshold connection condition.

In a third aspect, alone or in combination with one or more of the first and second aspects, the threshold connection condition is based at least in part on at least one of: a threshold reference signal received power (RSRP) associated with the connection, a threshold reference signal received quality (RSRQ) associated with the connection, or a threshold block error rate (BLER) associated with the connection.

In a fourth aspect, alone or in combination with one or more of the first through third aspects, process 600 includes transmitting, to the source BS, a radio resource control (RRC) message based at least in part on detecting that the connection between the UE and the source BS is associated with the threshold connection condition, where the RRC message is associated with indicating to the source BS that a handover failure has occurred between the UE and the target BS, and where the RRC message is associated with maintaining data scheduling by the source BS for the UE.

In a fifth aspect, alone or in combination with one or more of the first through fourth aspects, process 600 includes using, based at least in part on transmitting the RRC message, a signaling radio bearer (SRB) associated with the source BS or a data radio bearer (DRB) associated with the source BS to maintain communications between the UE and the source BS during the handover failure.

In a sixth aspect, alone or in combination with one or more of the first through fifth aspects, process 600 includes detecting that a connection between the UE and the source BS is not associated with a threshold connection condition, and declaring the radio link failure based at least in part on detecting that the connection is not associated with the threshold connection condition.

In a seventh aspect, alone or in combination with one or more of the first through sixth aspects, process 600 includes continuing to perform a random access channel procedure on the target BS without triggering a radio resource control connection reestablishment based at least in part on selectively declaring the radio link failure.

In an eighth aspect, alone or in combination with one or more of the first through seventh aspects, process 600 includes releasing a source stack and a source connection based at least in part on declaring the radio link failure.

In a ninth aspect, alone or in combination with one or more of the first through eighth aspects, process 600 includes transmitting an indication of the radio link failure to the target BS based at least in part on detecting the radio link failure.

In a tenth aspect, alone or in combination with one or more of the first through ninth aspects, a target BS setup procedure fails in connection with the timer; and process 600 includes triggering a radio resource control connection reestablishment after a release of the source BS.

In an eleventh aspect, alone or in combination with one or more of the first through tenth aspects, process 600 includes using a radio link failure recovery mechanism based at least in part on declaring the radio link failure to establish a source connection between the source BS and the UE, or to attempt to establish a target connection between the target BS and the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
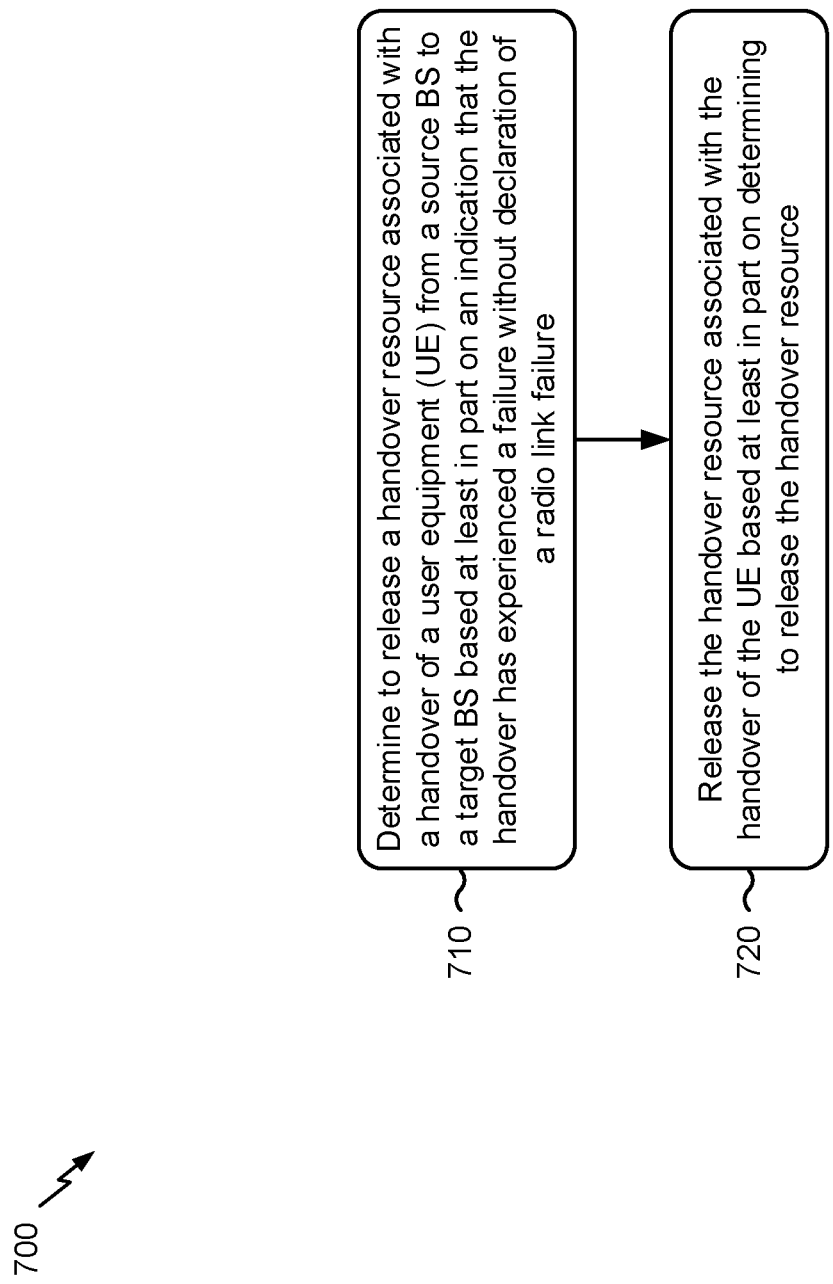
FIG. 7 is a diagram illustrating an example process performed, for example, by a target BS, in accordance with various aspects of the present disclosure.

FIG. 7 is a diagram illustrating an example process 700 performed, for example, by a target BS, in accordance with various aspects of the present disclosure. Example process 700 is an example where a target BS (e.g., target BS 110 and/or the like) performs operations associated with release of a handover resource.

As shown in FIG. 7, in some aspects, process 700 may include determining to release a handover resource associated with a handover of a UE from a source BS to the target BS based at least in part on an indication that the handover has experienced a failure without declaration of a radio link failure (block 710). For example, the BS (e.g., using transmit processor 220, receive processor 238, controller/processor 240, memory 242, and/or the like) may determine to release a handover resource associated with a handover of a UE from a source BS to the target BS based at least in part on an indication that the handover has experienced a failure without declaration of a radio link failure, as described above.

As further shown in FIG. 7, in some aspects, process 700 may include releasing the handover resource associated with the handover of the UE based at least in part on determining to release the handover resource (block 720). For example, the BS (e.g., using transmit processor 220, receive processor 238, controller/processor 240, memory 242, and/or the like) may release the handover resource associated with the handover of the UE based at least in part on determining to release the handover resource, as described above.

Process 700 may include additional aspects, such as any single aspect or any combination of aspects described below and/or in connection with one or more other processes described elsewhere herein.

In a first aspect, process 700 includes receiving, from the source BS, the indication that the handover has experienced the failure without declaration of the radio link failure, and determining to release the handover resource based at least in part on receiving the indication from the source BS.

In a second aspect, alone or in combination with the first aspect, process 700 includes initiating a timer based at least in part on at least one of receiving the indication from the source B S, or transmitting, to the source B S, a handover request acknowledgement (ACK), and releasing the handover resource includes releasing the handover resource based at least in part on expiration of the timer after initiating the timer.

In a third aspect, alone or in combination with one or more of the first and second aspects, process 700 includes receiving a radio link failure indication from the UE, and causing a release of a UE resource or a UE context on the source BS based at least in part on receiving a radio link failure indication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
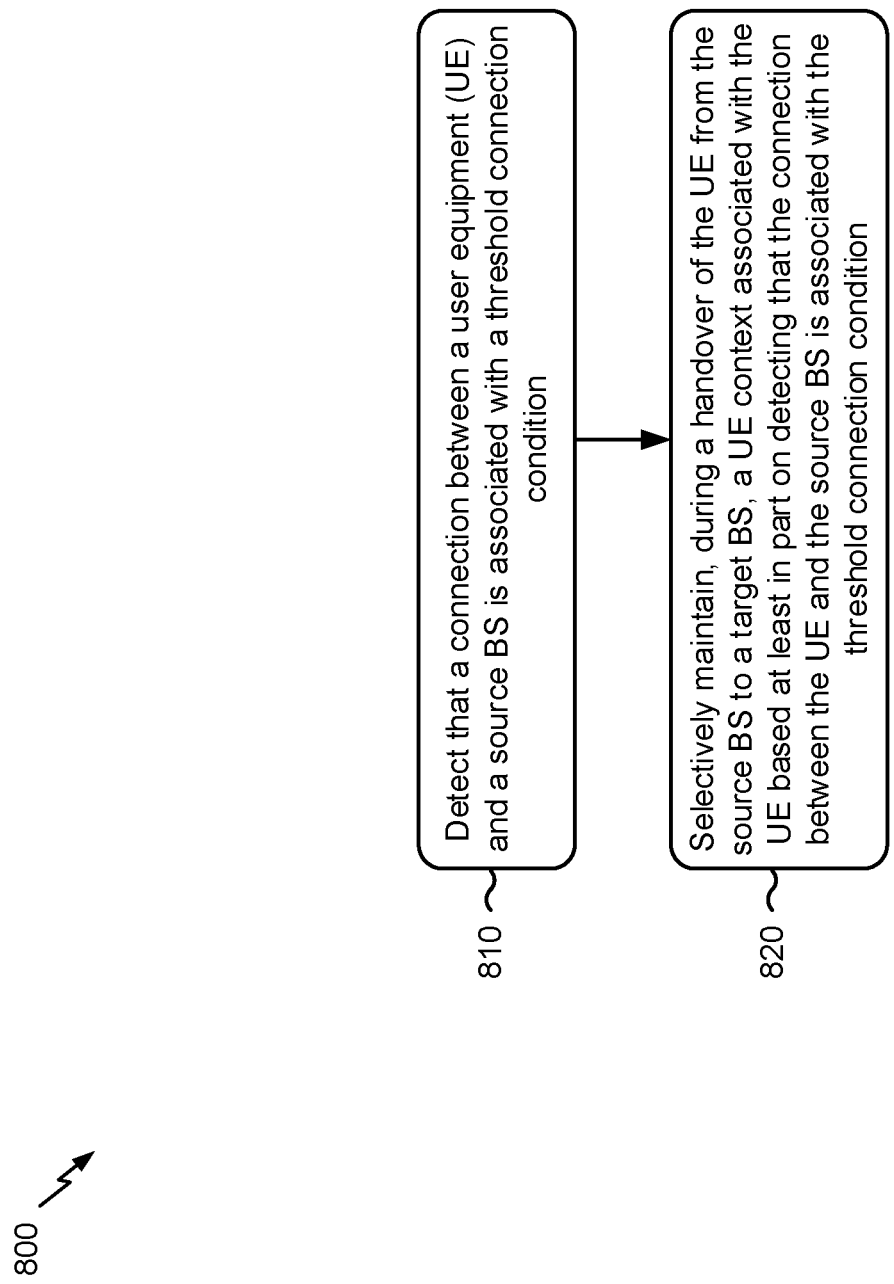
FIG. 8 is a diagram illustrating an example process performed, for example, by a source BS, in accordance with various aspects of the present disclosure.

FIG. 8 is a diagram illustrating an example process 800 performed, for example, by a source BS, in accordance with various aspects of the present disclosure. Example process 800 is an example where a source BS (e.g., BS 110 and/or the like) performs operations associated with release of a UE context.

As shown in FIG. 8, in some aspects, process 800 may include detecting that a connection between a UE and the source BS is associated with a threshold connection condition (block 810). For example, the BS (e.g., using transmit processor 220, receive processor 238, controller/processor 240, memory 242, and/or the like) may detect that a connection between a UE and the source BS is associated with a threshold connection condition, as described above.

As further shown in FIG. 8, in some aspects, process 800 may include selectively maintaining, during a handover of the UE from the source BS to a target BS, a UE context associated with the UE based at least in part on detecting that the connection between the UE and the source BS is associated with the threshold connection condition (block 820). For example, the BS (e.g., using transmit processor 220, receive processor 238, controller/processor 240, memory 242, and/or the like) may selectively maintain, during a handover of the UE from the source BS to a target BS, a UE context associated with the UE based at least in part on detecting that the connection between the UE and the source BS is associated with the threshold connection condition, as described above.

Process 800 may include additional aspects, such as any single aspect or any combination of aspects described below and/or in connection with one or more other processes described elsewhere herein.

In a first aspect, maintaining the UE context includes maintaining the UE context based at least in part on at least one of failing to receive, from the target BS, an indication to transmit an X2 data forward indication to the UE, failing to receive a UE context release indication from the target BS, or detecting expiration of a timer associated with the handover of the UE from the source BS to the target BS.

In a second aspect, alone or in combination with the first aspect, selectively maintaining the UE context includes causing a release of a UE resource or the UE context on the source BS based at least in part on receiving the radio link failure indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting that a timer has expired prior to completing a handover of the UE from a source base station (BS) to a target BS;
   selectively declaring, based at least in part on detecting that the timer has expired and whether a connection between the UE and the source BS is associated with a threshold connection condition, a radio link failure, wherein the UE does not declare the radio link failure based at least in part on detecting that the connection is associated with the threshold connection condition; and
   transmitting, to the source BS, a radio resource control (RRC) message when the connection is detected to be associated with the threshold connection condition.

2. The method of claim 1, wherein the timer is a T304 timer.

3. The method of claim 1, wherein the threshold connection condition is based at least in part on at least one of:
   a threshold reference signal received power (RSRP) associated with the connection,
   a threshold reference signal received quality (RSRQ) associated with the connection, or
   a threshold block error rate (BLER) associated with the connection.

4. The method of claim 1,
   wherein the RRC message is associated with indicating to the source BS that a handover failure has occurred between the UE and the target BS, and
   wherein the RRC message is associated with maintaining data scheduling by the source BS for the UE.

5. The method of claim 4, further comprising:
   using, based at least in part on transmitting the RRC message, a signaling radio bearer (SRB) associated with the source BS or a data radio bearer (DRB) associated with the source BS to maintain communications between the UE and the source BS during the handover failure.

6. The method of claim 1, further comprising:
   detecting that the connection is not associated with the threshold connection condition; and
   wherein selectively declaring the radio link failure comprises:
   declaring the radio link failure based at least in part on detecting that the connection is not associated with the threshold connection condition.

7. The method of claim 6, further comprising:
   continuing to perform a random access channel procedure on the target BS without triggering a radio resource control connection reestablishment based at least in part on declaring the radio link failure.

8. The method of claim 6, further comprising:
releasing a source stack and a source connection based at least in part on declaring the radio link failure.

9. The method of claim 6, further comprising:
transmitting an indication of the radio link failure to the target BS based at least in part on detecting the radio link failure.

10. The method of claim 6, wherein a target BS setup procedure fails in connection with the timer; and
wherein the method further comprises:
triggering a radio resource control connection reestablishment after a release of the source BS.

11. The method of claim 6, further comprising:
using a radio link failure recovery mechanism based at least in part on declaring the radio link failure to establish a source connection between the source BS and the UE, or to attempt to establish a target connection between the target BS and the UE.

12. A method of wireless communication performed by a target base station (BS), comprising:
receiving, from a source BS, an indication that a handover, of a user equipment (UE) from the source BS to the target BS, has experienced a failure without declaration of a radio link failure;
determining to release a handover resource associated with the handover based at least in part on receiving, from the source BS, the indication that the handover has experienced the failure without declaration of the radio link failure; and
releasing the handover resource associated with the handover of the UE based at least in part on determining to release the handover resource.

13. The method of claim 12, further comprising:
initiating a timer based at least in part on at least one of:
receiving the indication from the source BS, or
transmitting, to the source BS, a handover request acknowledgement (ACK); and
wherein releasing the handover resource comprises:
releasing the handover resource based at least in part on expiration of the timer after initiating the timer.

14. The method of claim 12, further comprising:
receiving a radio link failure indication from the UE; and
causing a release of a UE resource or a UE context on the source BS based at least in part on receiving the radio link failure indication.

15. The method of claim 12, wherein the handover resource includes a time frequency resource allocated for the handover.

16. A method of wireless communication performed by a source base station (BS), comprising:
detecting that a connection between a user equipment (UE) and the source BS is associated with a threshold connection condition; and
selectively maintaining, during a handover of the UE from the source BS to a target BS, a UE context associated with the UE based at least in part on detecting that the connection between the UE and the source BS is associated with the threshold connection condition and based at least in part on at least one of:
failing to receive, from the target BS, an indication to transmit an X2 data forward indication to the UE,
failing to receive a UE context release indication from the target BS, or detecting expiration of a timer associated with the handover of the UE from the source BS to the target BS.

17. The method of claim 16, wherein selectively maintaining the UE context comprises:
causing a release of a UE resource or the UE context on the source BS based at least in part on receiving a radio link failure indication.

18. The method of claim 16, wherein detecting that the connection is associated with the threshold connection condition comprises:
receiving, from the UE, a radio resource control (RRC) message based at least in part on the connection being associated with the threshold connection condition; and
wherein the method further comprises:
notifying, based at least in part on receiving the RRC message, the target BS that a handover failure has occurred with respect to the handover of the UE from the source BS to the target BS.

19. The method of claim 16, wherein detecting that the connection is associated with the threshold connection condition comprises:
receiving, from the UE, a radio resource control (RRC) message based at least in part on the connection being associated with the threshold connection condition,
wherein the RRC message indicates that a handover failure has occurred with respect to the handover of the UE from the source BS to the target BS; and
wherein the method further comprises:
continuing with data scheduling and/or data transfer for the UE during the handover failure based at least in part on receiving the RRC message.

20. A user equipment (UE) for wireless communication, comprising:
a memory; and
one or more processors operatively coupled to the memory, the memory and the one or more processors configured to:
detect that a timer has expired prior to completing a handover of the UE from a source base station (BS) to a target BS;
selectively declare, based at least in part on detecting that the timer has expired and whether a connection between the UE and the source BS is associated with a threshold connection condition, a radio link failure, wherein the UE does not declare the radio link failure based at least in part on detecting that the connection is associated with the threshold connection condition; and
transmit, to the source BS, a radio resource control (RRC) message when the connection is detected to be associated with the threshold connection condition.

21. The UE of claim 20, wherein the timer is a T304 timer.

22. The UE of claim 20, wherein the threshold connection condition is based at least in part on at least one of:
a threshold reference signal received power (RSRP) associated with the connection,
a threshold reference signal received quality (RSRQ) associated with the connection, or
a threshold block error rate (BLER) associated with the connection.

23. The UE of claim 20,
wherein the RRC message is associated with indicating to the source BS that a handover failure has occurred between the UE and the target BS, and wherein the RRC message is associated with maintaining data scheduling by the source BS for the UE.

24. The UE of claim 23, wherein the one or more processors are further configured to:
use, based at least in part on transmitting the RRC message, a signaling radio bearer (SRB) associated with the source BS or a data radio bearer (DRB) associated with the source BS to maintain communications between the UE and the source BS during the handover failure.

25. The UE of claim 20, wherein the one or more processors are further configured to:
detect that the connection is not associated with the threshold connection condition; and
wherein the one or more processors, when selectively declaring the radio link failure, are to:
declare the radio link failure based at least in part on detecting that the connection is not associated with the threshold connection condition.

26. The UE of claim 25, wherein the one or more processors are further configured to:
continue to perform a random access channel procedure on the target B S without triggering a radio resource control connection reestablishment, based at least in part on declaring the radio link failure.

27. The UE of claim 25, wherein the one or more processors are further configured to:
release a source stack and a source connection based at least in part on declaring the radio link failure.

28. The UE of claim 25, wherein the one or more processors are further configured to:
transmit an indication of the radio link failure to the target BS based at least in part on detecting the radio link failure.

29. The UE of claim 25, wherein a target BS setup procedure fails in connection with the timer; and
wherein the one or more processors are further configured to:
trigger a radio resource control connection reestablishment after a release of the source BS.

30. The UE of claim 25, wherein the one or more processors are further configured to:
use a radio link failure recovery mechanism based at least in part on declaring the radio link failure to establish a source connection between the source BS and the UE, or to attempt to establish a target connection between the target BS and the UE.

* * * * *